United States Patent Office 3,379,705
Patented Apr. 23, 1968

3,379,705
BUTADIENE POLYMERIZATION PROCESS
AND CATALYST
Alvin C. Rothlisberger, Bartlesville, Okla., assignor to
Phillips Petroleum Company, a corporation of Delaware
Continuation-in-part of application Ser. No. 273,006,
Apr. 15, 1963. This application June 17, 1964, Ser.
No. 376,309
16 Claims. (Cl. 260—94.3)

This is a continuation-in-part of copending application Ser. No. 273,006, filed April 15, 1963, now abandoned.

This invention relates to a novel and improved catalyst system for use in the polymerization of hydrocarbons. In one aspect, the invention relates to a process for polymerizing 1,3-butadiene so as to obtain a high cis 1,4-polybutadiene.

In recent years there has been a great deal of activity in the development of processes for producing olefin polymers. Polymers of monoolefins, such as ethylene and propylene, prepared by these processes have received wide acceptance by many industries. The more recent discovery in the field of diene polymerization of certain so-called stereospecific catalysts or initiators, which make possible the formation of polymers having a desired configuration, has aroused considerable interest. The polyemrs formed by the use of these catalysts often have outstanding physical properties which render them equal to and even superior to natural rubber. The present invention is concerned with a novel and improved catalyst system which is particularly applicable to the polymerization of 1,3-butadiene.

It is an object of this invention to provide a novel and improved catalyst system for use in the preparation of a polybutadiene containing a high percentage, e.g., from 85 to 98 percent and higher, of cis 1,4-addition.

Another object of the invention is to provide an improved process for producing a rubbery polymer of 1,3-butadiene.

A further object of the invention is to provide an improved process for polymerizing 1,3-butadiene in which the rubbery polymer produced contains a high percentage of cis 1,4-addition.

Figure 1:
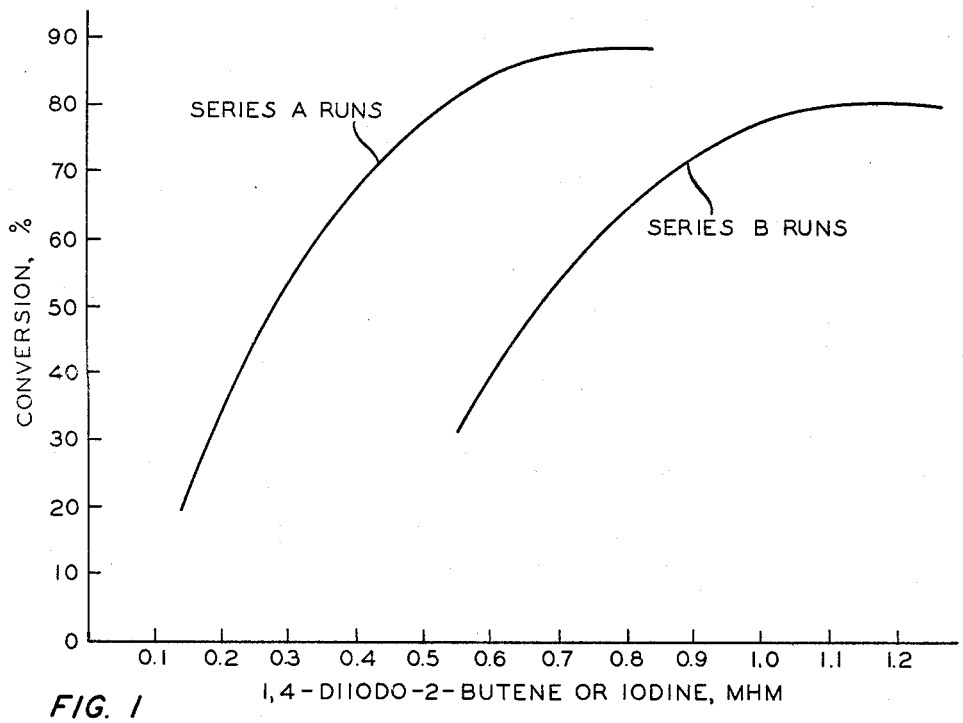
Figure 2:
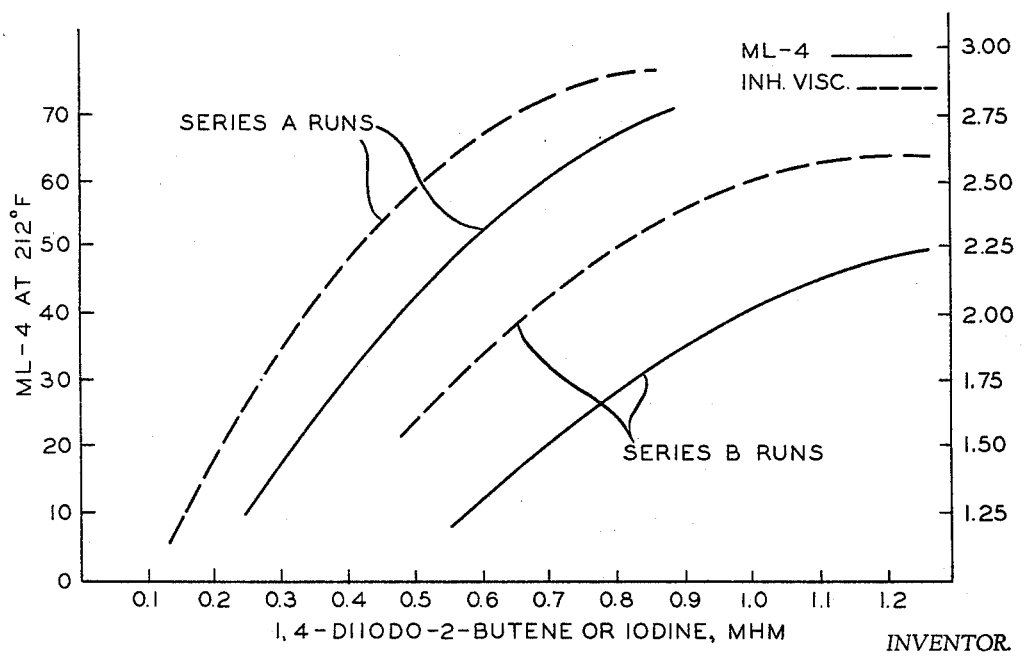

Other and further objects and advantages of the invention will become apparent to those skilled in the art upon consideration of the accompanying disclosure and the drawing in which FIGURES 1 and 2 illustrate graphically advantages obtained by use of the catalyst system of this invention.

The present invention resides in the discovery of an improved catalyst system which is particularly adapted for use in the polymerization of 1,3-butadiene. According to the invention, the catalyst is one which forms on mixing components comprising (a) an organometal compound having the formula $R_nM$ or $R_2AlH$, wherein R is alkyl, cycloalkyl, aryl or combinations of these radicals, such as alkaryl, aralkyl, cycloalkylalkyl or arycycloalkyl, the R radical preferably containing from 1 to 20 inclusive, carbon atoms, M is magnesium or aluminum, and n is an integer equal to the valence of the metal M, (b) a titanium halide having the formula $TiX_y$, wherein X is chlorine or bromine and y is an integer from 2 to 4, inclusive, and (c) at least one compound selected from the group consisting of 1,4-diiodo-2-butene, and the monomethyl and the dimethyl homologues thereof. The most frequently preferred catalyst system is obtained from 1,4-diiodo-2-butene as ingredient (c). When this catalyst system is contacted with 1,3-butadiene, a polymer containing from 85 to 98 percent and higher cis 1,4-addition is obtained. It has previously been proposed to polymerize 1,3-butadiene to a cis-polybutadiene, using a catalyst obtained by mixing a trialkylaluminum, a titanium chloride or bromide, and free iodine. The present catalyst system makes possible a polymerization process which has many advantages over the earlier process. For example, when using the instant catalyst system, the polymerization rate is much faster than with a catalyst prepared with free iodine. It has been found also that products having desired Mooney and inherent viscosity values can be obtained at lower catalyst levels. From a commercial standpoint the discovery of the present catalyst was particularly important since it provides a material saving in plant operation because of reduced catalyst requirements.

The amount of the organometal compound employed in preparing the catalyst system is dependent upon the particular organometal used. When an organoaluminum compound is utilized, the mol ratio of organometal to titanium halide is generally in the range of 2:1 to 20:1, preferably in the range of 3:1 to 8:1. The mol ratio of titanium halide to iodine-containing compound is usually in the range of 0.20:1 to 10:1, preferably in the range of 0.25:1 to 3:1, when using an organoaluminum compound. When an organomagnesium compound is used, the mol ratio of organometal to titanium halide is generally in the range of 0.75:1 to 3:1, and the mol ratio of titanium halide to iodine-containing compound is usually in the range of 0.4:1 to 3.0:1. The concentration of total catalyst used in the present process can vary over a relatively wide range. The catalyst level is generally in the range of 1 to 20 gram millimoles of the organometal compound per 100 grams of 1,3-butadiene to be polymerized. The actual catalyst level used is, in general, determined by the Mooney value and inherent viscosity of the product which is desired.

Examples of organometal compounds suitable for use in preparing the present catalyst system include dimethylmagnesium, diethylmagnesium, di - n - propylmagnesium, di - tert - butylmagnesium, di-n-hexylmagnesium, didecylmagnesium, di(tridecyl)magnesium, dieicosylmagnesium, dicyclohexylmagnesium, di - 4 - methylcyclohexylmagnesium, dibenzylmagnesium, di(4 - phenyl - n-butyl)magnesium, diphenylmagnesium, di - 1 - naphthylmagnesium, di - 4-tolylmagnesium, di-(2,4-diethylphenyl)-magnesium, di(3,4 - di - n - heptylphenyl magnesium, methylethylmagnesium, methylphenylmagnesium, butylbenzylmagnesium, triethylaluminum, tri-n-propylaluminum, tri - n - butylaluminum, triisobutylaluminum, tri - n - heptylaluminum, tridodecylaluminum, trieicosylaluminum, triphenylaluminum, tribenzylaluminum, tri (2-phenylethyl)aluminum, tri(6 - phenylhexyl)aluminum, tri[6(1 - naphthyl)hexyl] aluminum, tri[9(2 - naphthyl) nonyl]aluminum, tri - 2 - tolylaluminum, tri(2,4 - dimethylphenyl)aluminum, tri(3 - ethylphenyl)aluminum, tri(2,4 - dimethyl - 6 - ethylphenyl)aluminum, tri(4-n-butylphenyl)aluminum, tri(2 - n - hexylphenyl)aluminum, tri(2,4,6 - isobutylphenyl)aluminum, tri(4 - dodecylphenyl)aluminum, tri(2 - methyl - 1 -naphthyl)aluminum, tri(2,4,5,7-tetraethyl - 1 - naphthyl)aluminum, tri(4,5-dipentyl - 2 - naphthyl)aluminum, tricyclohexylaluminum, tricyclopentylaluminum, methyldicyclohexylaluminum, tri (4 - pentadecyclopentyl)aluminum, tri(4 - ethylcyclohexyl)aluminum, tri(2,4 - diethylcyclohexyl)aluminum, tri(3 - isobutylcyclohexyl)aluminum, tri(2,4,6 - tri - n-propylcyclohexyl)aluminum, tri(2-n - propylcyclopentyl) aluminum, tri(2-ethylcyclohexyl)aluminum, tri(2 - cyclohexylethyl) aluminum, tri(3-cyclopentylbutyl) aluminum, tri(14-cyclohexyltetradecyl)aluminum, dimethylaluminum hydride, diethylaluminum hydride, diisobutylaluminum hydride, didecylaluminum hydride, dieicosylaluminum hydride, dicyclopentylaluminum hydride, dicyclooctylaluminum hydride, di(3 - ethylphenyl)aluminum hydride, diphenylaluminum hydride, propylphenylaluminum hydride, di(3 - cyclohexylpropyl)aluminum hydride, di(4 - cycloheptyldecyl)aluminum hydride, di(3 - phenylbutyl)

aluminum hydride, dibenzylaluminum hydride, di(2,4 - diphenyloctyl)aluminum hydride, di(2 - methylcyclopentyl)aluminum hydride, di(5 - nonylcyclononyl)aluminum hydride, di(2-phenylcyclopentyl)aluminum hydride, di(2,4-diphenylcyclooctyl)aluminum hydride, di(2 - methylphenyl)aluminum hydride, di(2,4 - dibutylphenyl)aluminum hydride, di(2,4 - diheptylphenyl)aluminum hydride, di(4-cyclobutylphenyl)aluminum hydride, di(2,4 - dicyclopentylphenyl)aluminum hydride, di(2,4 - diisopropylphenyl)aluminum hydride, and the like.

The 1,4-diiodo-2-butene used in forming the present catalyst system is preferably prepared by reacting 1,3-butadiene and iodine in the presence of light. The two reactants are brought together at any desired temperature, e.g., at a temperature in the range of −100 to 250° F. The time for the reaction will depend upon the temperature, but it is usually in the range of 0.10 second to 1 hour, preferably in the range of 30 seconds to 15 minutes. It has been found that the reaction of the butadiene with iodine is advantageously carried out in the presence of light, such as sunlight, fluorescent light, ultraviolet light, or the like. Other conditions being equal, if the reaction is not conducted in the presence of light, a longer reaction time is needed to form the 1,4-diiodo-2-butene. The mol ratio of 1,3-butadiene to iodine used in preparing the 1,4-diiodo-2-butene is preferably at least 1 to 1 and is generally in the range of 20:1 to 1000:1 or higher.

Instead of 1,4-diiodo-2-butene, 1,4-diiodo-2-methyl-2-butene can be utilized. It can be prepared by reacting elemental iodine with isoprene. The principles discussed hereinbefore also apply to the preparation and use of this compound. Also applicable are 1,4-diiodo-2,3-dimethyl-2-butene, and 1,4-diiodo-2-pentene.

Examples of specific catalyst systems that can be employed in the practice of the polymerization process include those that form on mixing the following components: diethylmagnesium, titanium tetrachloride, and 1,4-diiodo-2-butene; diphenylmagnesium, titanium tetrachloride, and 1,4-diiodo-2-butene; diphenylmagnesium, titanium tetrabromide and 1,4-diiodo-2-butene; dicyclohexylmagnesium, titanium tetrachloride and 1,4-diiodo-2-butene; di-1-naphthylmagnesium, titanium tetrabromide and 1,4-diiodo-2-butene; di-4-tolylmagnesium, titanium trichloride and 1,4-diiodo-2-butene; triethylaluminum, titanium tetrachloride and 1,4-diiodo-2-butene; tri-n-butylaluminum, titanium tetrabromide and 1,4-diiodo-2-butene; triisobutylaluminum, titanium tetrachloride and 1,4-diiodo-2-butene; tri-n-hexylaluminum, titanium tetrabromide and 1,4-diiodo-2-butene; triphenylaluminum, titanium tetrachloride and 1,4-diiodo-2-butene; tri-2-tolylaluminum, titanium trichloride and 1,4-diiodo-2-butene; tricyclohexylaluminum, titanium tetrachloride and 1,4-diiodo-2-butene; dimethylaluminum hydride, titanium tetrachloride and 1,4-diiodo-2-butene; dipropylaluminum hydride, titanium tribromide and 1,4-diiodo-2-butene; diisobutylaluminum hydride, titanium tetrachloride and 1,4-diiode-2-butene; diphenylaluminum hydride, titanium tetrabromide and 1,4-diiodo-2-butene; dibenzylaluminum hydride, titanium tetrachloride and 1,4-diiodo-2-butene; dimethylmagnesium, titanium dichloride and 1,4-diiodo-2-butene; tri-n-propylaluminum, titanium dibromide and 1,4-diiodo-2-butene; triethylaluminum, titanium tetrachloride, and 1,4-diiodo-2-methyl-2-butene; triisobutylaluminum, titanium tetrachloride, and 1,4-diiodo-2-pentene; and di-n-butylaluminum hydride, titanium dichloride and 1,4-diiode-2-butene.

The polymerization process of this invention is usually carried out in the presence of a diluent. Diluents suitable for use in the process are hydrocarbons which are non-detrimental to the polymerization reaction. Suitable diluents include aromatic hydrocarbons, such as benzene, toluene, the xylenes, ethylbenzene, and mixtures thereof. It is also within the scope of the invention to use straight and branched chain paraffins which contain up to and including 12 carbon atoms per molecule. Examples of suitable paraffins include propane, normal butane, normal pentane, isopentane, normal hexane, isohexane, 2,2,4-trimethylpentane (isooctane), normal decane, normal dodecane, and the like. Mixtures of these paraffinic hydrocarbons can also be employed as diluents in carrying out the process. Cycloparaffins, such as cyclohexane and methylcyclohexane, may also be used as diluents. It is usually preferred to conduct the polymerization in the presence of an aromatic hydrocarbon since polymers having a higher cis-content are produced when operating with this diluent.

The polymerization process of this invention can be conducted at temperatures varying over a relatively wide range, e.g., from −100 to 250° F. It is usually preferred to operate at a temperature in the range of −30 to 160° F. The polymerization reaction can be carried out under autogenous pressure or at any suitable pressure sufficient to maintain the reaction mixture substantially in the liquid phase. The pressure thus depends upon the particular diluent employed and the temperature at which the polymerization is conducted. However, higher pressures can be utilized if desired, these pressures being obtained by some such suitable method as the pressurization of the reactor with the gas which is inert with respect to a polymerization reaction. It is to be understood that it is within the scope of the invention to conduct the polymerization in the solid phase.

The process of this invention can be carried out as a batch process by charging 1,3-butadiene to a reactor containing catalyst and diluent. When proceeding in this manner, the 1,4-diiodo-2-butene is prepared as described above after which it can be added to the reactor containing the organometal component, the butadiene and the diluent. The titanium halide is then charged to the reactor and on mixing with the other two components forms the catalyst which initiates the polymerization of the butadiene. In another procedure, the entire amount of 1,3-butadiene to be polymerized is charged to a reactor containing diluent. Thereafter, an amount of iodine sufficient to form the amount of 1,4-diiodo-2-butene to be used in preparing the catalyst is added to the reactor. By exposing the reactor contents to light, the desired catalytic component 1,4-diiodo-2-butene is quickly formed in situ. The other two catalytic components, i.e., an organometal compound and a titanium chloride or bromide, are then added and on mixing with the 1,4-diiodo-2-butene form the catalyst system which initiates the polymerization of the butadiene. It is to be understood that it is within the scope of the invention to preform the catalyst by mixing the catalyst components within a separate catalyst preparation vessel. The catalyst so formed can then be passed into the reactor containing monomer and diluent, or these latter materials can be added after the catalyst. The process can also be carried out continuously by maintaining the abovementioned concentrations of reactants in the reactor for a suitable residence time. The present catalyst system is particularly suitable for employment in a continuous type of operation. In a preferred method of operation, the diluent, the butadiene to be polymerized, and the organometal to be used in forming the catalyst are charged to a mixing zone wherein these materials are thoroughly mixed. The presence of the organometal in this mixture serves to remove materials present in the monomer and diluent, such as oxygen and moisture, which might subsequently have an adverse effect on the catalyst. Iodine and butadiene are charged to a separate vessel wherein they are reacted, preferably in the presence of light, thereby forming 1,4-diiodo-2-butene. This material is thereafter added to the mixture recovered from the mixing zone and then introduced as the feed stream into the reactor. Prior to entering the reactor, the titanium halide is added to the stream. The catalyst that forms on mixing the organometal, the titanium halide and the 1,4-diiodo-2-butene initiates the polymerization of the butadiene in the reactor and a stream containing polymer in solution is continuously withdrawn from the reactor. The residence time in a continuous process will vary within rather wide limits, depending upon such variables as temperature, pressure, the ratios of catalyst components and catalyst concentration. In a continuous process, the residence time usually falls within the range of 1 second to 2 hours when conditions within the specified ranges are employed. When a batch process is utilized, the time for the reaction can be as high as 24 hours or more.

Various materials are known to be detrimental to the catalyst composition of this invention. These materials include carbon dioxide, oxygen and water. It is usually desirable, therefore, that the butadiene be freed of these materials as well as other materials which may tend to inactivate the catalyst. Any of the known methods for removing such contaminants can be used. Furthermore, when a diluent is utilized in the process, it is preferred that this material be substantially free of impurities such as water, oxygen and the like. In this connection, it is desirable to remove air and moisture from the reaction vessel in which the polymerization is to be conducted. Although it is preferred to carry out the polymerization under anhydrous or substantially anhydrous conditions, it is to be understood that some small amounts of these catalyst-inactivating materials can be tolerated in the reaction mixture. However, it is also to be understood that the amount of such materials which can be tolerated is insufficient to cause complete deactivation of the catalyst.

Upon completion of the polymerization reaction, when a batch process is used, the total reaction mixture is then treated to inactivate the catalyst and recover the rubbery product. Any suitable method can be employed in carrying out this treatment of the reaction mixture. In one method the polymer is recovered by steam stripping the diluent from the polymer. In another suitable method, a catalyst-inactivating material, such as an alcohol, is added to the mixture so as to inactivate the catalyst and cause precipitation of the polymer. The polymer is then separated from the alcohol and diluent by any suitable method, such as by decantation or filtration. It is often preferred to add initially only an amount of the catalyst-inactivating material which is sufficient to inactivate the catalyst without causing precipitation of the polymer. It is also found to be advantageous to add an antioxidant, such as 2,2′-methylene-bis(4-methyl-6-tert-butylphenol), to the polymer solution prior to recovery of the polymer. After addition of the catalyst-inactivating material and the antioxidant, the polymer present in the solution can then be coagulated by the addition of an excess of a material such as ethyl alcohol or isopropyl alcohol. When the process is carried out continuously, the total effluent from the reactor can be pumped to a catalyst-inactivating zone where the reactor effluent is contacted with a suitable catalyst-inactivating material, such as an alcohol or a rosin acid. When an alcohol is used as the catalyst-inactivating material, it also functions to precipitate the polymer. In the event catalyst-inactivating materials which are employed do not perform this dual function, a suitable material, such as an alcohol, can be added to precipitate the polymer. It is, of course, to be realized that it is within the scope of the invention to employ other suitable methods to recover the polymer solution. After separation from the water or alcohol and diluent by filtration or other suitable means, the polymer is then dried.

The polymers produced in accordance with this invention are rubbery polymers. The polymers can be compounded by the various methods that have been used in the past in compounding natural and synthetic rubbers. Vulcanization accelerators, vulcanizing agents, reinforcing agents, plasticizers, antioxidants, pigments and fillers such as have been employed in natural or synthetic rubbers can likewise be used in compounding the rubbers of this invention. It is also within the scope of this invention to blend the polymers with other polymeric material such as natural rubber, synthetic cis 1,4-polyisoprene, copolymers of butadiene and styrene, polyethylene, ethylene-propylene copolymers, and the like. As mentioned previously, the polymers of this invention have a very high cis-content. This property renders them very suitable for applications requiring low hysteresis, high resilience and low freeze point. In general, the products have utility in applications where natural and synthetic rubbers are used. They are particularly suitable for use in the manufacture of automobile and truck tires and other rubbery articles, such as gaskets.

A more comprehensive understanding of the invention can be obtained be referring to the following illustrative examples which are not intended, however, to be unduly limitative of the invention.

Samples of certain of the polymer products produced in the runs described in the examples were examined by infrared analysis. This work was carried out in order to determine the percentage of the polymer formed by cis 1,4-addition, trans 1,4-addition, and 1,2-addition of the butadiene. The procedure described hereinafter was employed in making these determinations.

Polymer samples were dissolved in carbon disulfide to form a solution having 25 grams of polymer per liter of solution. The infrared spectrum of each of the solutions (percent transmission) was then described in a conventional infrared spectrometer.

The percent of the total unsaturation present as trans 1,4- was calculated according to the following equation and consistent units:

$$\epsilon = \frac{E}{tc}$$

where $\epsilon$=extinction coefficient (liters-mols$^{-1}$-centimeters$^{-1}$); $E$=extinction (log $I_0/I$); $t$=path length (centimeters); and $c$=concentration (mols double bond/liter). The extinction was determined at the 10.35 micron band and the extinction coefficient was 146 (liters-mols$^{-1}$-centimeters$^{-1}$).

The percent of the total unsaturation present as cis 1,4- was obtained by subtracting the trans 1,4- and 1,2- (vinyl) determined according to the above procedure from the theoretical unsaturation, assuming one double bond per each $C_4$ unit in the polymer.

EXAMPLE I

A series of runs was carried out in which 1,3-butadiene was polymerized with a catalyst formed by mixing triisobutylaluminum, titanium tetrachloride and 1,4-diiodo-2-butene. A series of control runs was also carried out in which the catalyst was formed by mixing triisobutylaluminum, titanium tetrachloride and free iodine. The following recipe was used in the runs:

Recipe

| | Parts by weight |
|---|---|
| 1,3-butadiene | 100 |
| Toluene | 900 |
| Triisobutylaluminum (TBA), (2.8 mhm.)[1] | 0.554 |
| 1,4-diiodo-2-butene (DIB) or iodine ($I_2$) | Variable |
| Titanium tetrachloride (TTC), (0.4 mhm.)[1] | 0.076 |
| Temperature, °F. | 41 |
| Time, hours | 2 |

[1] Millimoles per 100 grams monomer.

In the series of runs carried out according to the invention, designated herein as Series A, the 1,4-diido-2-butene was formed in the reactor initially by reacting butadiene with iodine in the presence of light. Thus, toluene was charged first to the reactor after which it was purged with nitrogen. Butadiene was then added followed by the amount of iodine required to form the iodine-containing compound used in preparing the catalyst. The resulting mixture was agitated for 10 minutes at a temperature of 41° F. in the presence of fluorescent light. The catalyst was then formed by introducing triisobutylaluminum and titanium tetrachloride into the reactor in the order named. The catalyst so formed by the mixing of the indicated materials immediately initiated the polymeriztaion of the butadiene present in the reactor. In the series of control runs, designated herein as Series B, the procedure followed was to charge the toluene first, after which the reactor was purged with nitrogen. The butadiene was then added followed by the triisobutylaluminum, and the resulting mixture was agitated at 41° F. for 10 minutes in the presence of fluorescent light. Iodine was then added followed by the titanium tetrachloride. In the Series A runs, a control run was carried out in which the procedure used in the Series B runs was followed. Also, in the Series B runs, a control run was carried out as in the Series A runs in which 1,4-diiodo-2 butene was used in forming the catalyst. In each run at the close of the polymerization period, the reaction was terminated by the addition of an isopropyl alcohol solution of 2,2'-methylene-bis(4-methyl-6-tert-butylphenol), the amount used being sufficient to provide 1 part by weight per 100 parts by weight of rubber. The polymers were coagulated with isopropyl alcohol, separated, and then dried. The results obtained in the runs are shown below in Table I.

mental iodide is required in the catalyst system in producing a polymer having a desired Mooney and inherent viscosity value.

Example II

Two runs were carried out in which butadiene was polymerized with a catalyst formed by mixing trisobutylaluminum, titanium tetrachloride and 1,4-diiodo-2-butene. The procedure followed in forming the catalyst was the same as that described in the Series A runs of Example I. Control runs were also conducted in which butadiene was polymerized according to the procedure described for the Series B runs of Example I. The following recipe was employed in the runs:

Recipe

|  | Parts by weight |
|---|---|
| 1,3-butadiene | 100 |
| Toluene | 1200 |
| Triisobutylaluminum (TBA) | variable |
| 1,4-diiodo-2-butene (DIB) or Iodine (I$_2$) | variable |
| Titanium tetrachloride (TTC), (0.4 mhm.) | 0.076 |
| Temperature, ° F. | 41 |
| Time, hours | 21 |

TABLE I.—SERIES A

| Run No. | DIB, mhm. | TBA:DIB:TTC Mole Ratio | Conv., percent | Inh.[3] Visc. | ML-4[4] at 212° F. | Microstructure, Percent | | |
|---|---|---|---|---|---|---|---|---|
|  |  |  |  |  |  | Cis | Trans | Vinyl |
| 1 | 0.80 | 7.0:2.0:1 | 90 | 2.88 | 67 | 94.6 | 2.3 | 3.1 |
| 2 | 0.70 | 7.0:1.75:1 | 88 | 2.80 | 60 | 94.8 | 2.1 | 3.1 |
| 3 | 0.60 | 7.0:1.50:1 | 83 | 2.68 | 53 |  |  |  |
| 4 | 0.50 | 7.0:1.25:1 | 73 | 2.43 | 40 | 95.3 | 1.6 | 3.1 |
| 5 | 0.40 | 7.0:1:1 | 65 | 2.20 | 28 |  |  |  |
| 6 | 0.30 | 7.0:0.75:1 | 60 | 1.89 | 17 |  |  |  |
| 7 | 0.20 | 7.0:0.50:1 | 23 | 1.20 |  |  |  |  |
| 8[1] | 0.80 | 7.0:2.0:1 | 58 | 2.18 | 28 | 95.2 | 1.6 | 3.2 |

SERIES B

| Run No. | I$_2$, mhm. | TBA:I$_2$:TTC Mole Ratio | Conv., percent | Inh.[3] Visc. | ML-4[4] at 212° F. | Microstructure, percent | | |
|---|---|---|---|---|---|---|---|---|
|  |  |  |  |  |  | Cis | Trans | Vinyl |
| 9 | 1.20 | 7.0:3.00:1 | 81 | 2.54 | 47 | 95.0 | 1.8 | 3.2 |
| 10 | 1.10 | 7.0:2.75:1 | 75 | 2.46 | 42 |  |  |  |
| 11 | 1.00 | 7.0:2.50:1 | 75 | 2.40 | 40 |  |  |  |
| 12 | 0.90 | 7.0:2.25:1 | 66 | 2.30 | 32 |  |  |  |
| 13 | 0.80 | 7.0:2.00:1 | 60 | 2.12 | 24 | 95.6 | 1.3 | 3.1 |
| 14 | 0.70 | 7.0:1.75:1 | 53 | 1.91 | 16 | 95.5 | 1.4 | 3.1 |
| 15 | 0.60 | 7.0:1.50:1 | 52 | 1.87 | 16 |  |  |  |
| 16[2] | 0.70 | 7.0:1.75:1 | 87 | 2.71 | 58 |  |  |  |

[1] Control run in which the charge procedure of the Series B runs was used.
[2] Control run in which the catalyst used was formed by mixing 1,4-diiodo-2,butene (DIB) with triisobutylaluminum and titanium tetrachloride as in the Series A runs.
[3] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.
[4] ASTM D-1646-61. Mooney viscometer, large rotor, 212° F., 4 minutes.

The data shown in the forging table are presented graphically in FIGURES 1 and 2. The curves in FIGURE 1 show that at a given level of organometal much less 1,4-diiodo-2-butene than iodine is required in order to obtain the same conversion. The curves in FIGURE 2 demonstrate that much less 1,4-diiodo-2-butene then ele- The results obtained in the runs are sown below in Table II.

TABLE II

| Run No. | TBA, mhm. | DIB or I$_2$,[1] mhm. | TBA:DIB or I$_2$:TTC Mole Ratio | Conv., Percent | Inh[2] Visc. | ML-4[2] at 212° F. |
|---|---|---|---|---|---|---|
| 1 | 2.6 | 0.4 | 6.5:1.00:1.0 | 96 | 2.31 | 32 |
| 2 (Control) | 2.6 | 0.8 | 6.5:2.00:1.0 | 96 | 2.35 | 38 |
| 3 | 2.4 | 0.4 | 6.0:1.00:1.0 | 97 | 2.38 | 40 |
| 4 (Control) | 2.4 | 0.8 | 6.0:2.00:1.0 | 98 | 2.64 | 54 |

[1] In runs 1 and 3 the catalyst was formed as in the Series A runs of Example I. In control runs 2 and 4, the catalyst was formed as in the Series B runs of Example I.
[2] See appropriate footnote to Table I. (Footnote 3).

The data in Table II show that although the products obtained were similar, only about half as much 1,4-diiodo-2-butene as free iodine was required in forming the catalyst used in the runs of the invention.

Example III

A series of runs was conducted to show the effect of light on the reaction in which 1,4-diiodo-2-butene is prepared. In two runs the same procedure was followed as in the Series A runs of Example I except that light was excluded by covering the reactor with black tape. Two similar runs were carried out in the presence of fluorescent light. A control run was also carried out in the presence of fluorescent light in which the procedure followed in the Series B runs of Example I was used. The following recipe was employed in the runs:

Recipe

| | Parts by weight |
|---|---|
| 1,3-butadiene | 100 |
| Toluene | 1200 |
| Triisobutylaluminum (TBA), (2,4 mhm.) | 0.475 |
| 1,4-diiodo-2-butene (DIB) or Iodine ($I_2$) | variable |
| Titanium tetrachloride (TTC), (0.4 mhm.) | 0.076 |
| Temperature, °F. | 41 |
| Time, hours | 2 |

The results obtained in the runs are shown below in Table III.

TABLE III

| Run No. | DIB or $I_2$, mhm. | TBA:DIB $I_2$:TTC Mole | Conv., Percent | Inh.[1] Visc. | Light [2] |
|---|---|---|---|---|---|
| 1 | 0.8 | 6.0:2.0:1.0 | 82 | 2.40 | Excluded. |
| 2 | 0.4 | 6.0:1.0:1.0 | 32 | 1.55 | Do. |
| 3 | 0.4 | 6.0:1.0:1.0 | 83 | 2.18 | Present. |
| 4 | 0.8 | 6.0:2.0:1.0 | 82 | 2.39 | Do. |

[1] See Table I.
[2] Runs 1 to 3 were carried out according to the procedure of the Series A runs of Example I except that in runs 1 and 2 light was excluded from the reactor. Run 4 is a control run in which catalyst was formed in the presence of light, following the procedure of the Series B runs of Example I.

The results shown in Table III demonstrate the value of light in quickly forming 1,4-diiodo-2-butene which is used in preparing the improved catalyst of this invention. In Run 1 in which light was excluded from the butadiene-iodine reaction, about the same results were obtained as in Run 4 in which the catalyst was prepared by mixing triisobutylaluminum, titanium tetrachloride and free iodine. A comparison of these results with Run 3 shows that in the latter case only half as much 1,4-diiodo-2-butene was required to give a lower inherent viscosity polymer at substantially the same conversion. In Run 2 in which light was also excluded from the butadiene-iodine reaction, a product having a much lower inherent viscosity was obtained but the conversion was much lower than in Run 3.

Example IV

A run was carried out in which butadiene was polymerized with a catalyst formed by mixing triisobutylaluminum, titanium tetrachloride and 1,4-diiodo-2-butene. A control run was also conducted in which the catalyst was formed by mixing triisobutylaluminum, titanium tetrachloride and free iodine. The following recipes were used in these runs:

RECIPES

| | Parts by Weight | |
|---|---|---|
| | Run 1 | Run 2 (Control) |
| 1,3-butadiene | 100 | 100 |
| Toluene | 1,200 | 1,200 |
| Triisobutylaluminum (TBA) | [1] 0.475 | [1] 0.475 |
| 1,4-diiodo-2-butene (DIB) | [2] 0.102 | |
| Iodine ($I_2$) | | [3] 0.204 |
| Titanium tetrachloride (TTC) | [2] 0.076 | [2] 0.076 |
| TBA:DIB:TTC mole ratio | 6:1:1 | |
| TBA:$I_2$:TTC mole ratio | | 6:2:1 |
| Temperature, °F | 41 | 41 |
| Time, hours | 2 | 2 |

[1] 2.4 mhm.
[2] 0.4 mhm.
[3] 0.8 mhm.

The procedure followed in Run 1 carried out according to the invention was to charge toluene to the reactor which was then purged with nitrogen. The butadiene, except for the minor amount used for the preparation of 1,4-diiodo-2-butene, was then introduced followed by the triisobutylaluminum. The 1,4-diiodo-2-butene was prepared in a separate reactor by charging thereto 2 millimoles of the butadiene and 0.4 millimole of iodine. These materials were reacted in toluene solution at room temperature (70 to 75° F.) for 45 minutes in the presence of fluorescent light. The 1,4-diiodo-2-butene so prepared in solution in toluene was then charged to the reactor containing toluene, butadiene and triisobutylaluminum. The temperature of the reaction mixture was adjusted to 41° F. after which titanium tetrachloride was added. In control Run 2, toluene, butadiene, triisobutylaluminum, iodine and titanium tetrachloride were charged in that order to a polymerization reactor. The temperature was adjusted in the control run as in the run of the invention prior to charging the titanium tetrachloride. At the end of the reaction periods, each of the runs was terminated by adding an isopropyl alcohol solution of 2,2'-methylene-bis(4-methyl-6-tert-butylphenol), the amount used being sufficient to provide 1 part by weight per 100 parts by weight of rubber. The polymers were coagulated with isopropyl alcohol, separated and dried. The results obtained in the runs are shown below in Table IV.

TABLE IV

| Run No. | DIB or $I_2$, mhm. | Conv., Percent | Inh.[1] Visc. | ML–4 [1] at 212° F. | Microstructure, Percent | | |
|---|---|---|---|---|---|---|---|
| | | | | | Cis | Trans | Vinyl |
| 1 | 0.4 | 86 | 2.39 | 40 | 95.2 | 1.8 | 3.0 |
| 2 (Control) | 0.8 | 82 | 2.38 | 38 | | | |

[1] See appropriate footnote to Table I.

The data in Tale IV show that while there was no substantial difference in the products obtained, only half as much 1,4-diiodo-2-butene as iodine was required in the run carried out according to the invention.

Runs are also carried out in which 1,3-butadiene is polymerized with catalyst systems that are prepared by mixing the following components:

(1) diethylmagnesium, titanium tetrabromide and 1,4-diiodo-2-butene;
(2) diisobutylaluminum hydride, titanium trichloride and 1,4-diiodo-2-butene;
(3) di-n-octylmagnesium, titanium dichloride and 1,4-diiodo-2-butene; and
(4) triphenylaluminum, titanium tetrachloride and 1,4-diiodo-2-butene.

The recipes employed and the procedure followed in the runs are essentially the same as those described in Example I for the Series A runs. Polybutadiene products containing a high percent of cis, 1,4-addition are produced in the runs.

Example V

Runs were carried out in which 1,3-butadiene was polymerized in the presence of a catalyst formed on mixing triisobutylaluminum, titanium tetrachloride, and 1,4-diiodo-2-methyl-2-butene (reaction product of iodine and isoprene). Control runs were also carried out in which the catalyst was formed by mixing triisobutylaluminum, titanium tetrachloride, and free iodine. The following recipe was used:

| | Parts by weight |
|---|---|
| 1,3-butadiene | 100 |
| Toluene | 1000 |
| Triisobutylaluminum (TBA) (2.2 mhm.) | 0.435 |
| Titanium tetrachloride (TTC) (0.4 mhm.) | 0.076 |
| 1,4-diiodo-2-2methyl-2-butene (DIMB) or iodine | variable |
| Temperature, ° F. | 41 |
| Time, hours | 2 |

Mhm.=millimoles per 100 grams monomer.

In the first two runs carried out according to the invention, the 1,4-diiodo-2-methyl-2-butene was formed by reacting iodine with isoprene. A mixture of isoprene and a 0.2 molar solution of iodine in toluene was agitated for one hour at 30° C. (86° F.) and the reaction product employed as a catalyst component. A 50/1 mole ratio of isoprene/iodine was used for preparing the 1,4-diiodo-2-methyl-2-butene. The procedure for the polymerization runs was to charge toluene to the reactor first. The reactor was then purged with nitrogen and butadiene was added. Triisobutylaluminum was introduced followed by the 1,4-diiodo-2-methyl-2-butene and then the titanium tetrachloride. In the control runs the procedure was to charge the toluene first after which the reactor was purged with nitrogen. The butadiene was then added followed by the triisobutylaluminum. This mixture was agitated 10 minutes at 41° F. after which iodine was added and then the titanium tetrachloride.

At the close of the polymerization period each reaction was terminated by the addition of a solution of 2,2'-methylene-bis (4-methyl-6-tert-butylphenol) in a mixture of equal volumes of isopropyl alcohol and toluene, the amount used being sufficient to provide one part by weight per 100 parts by weight of rubber. The polymers were coagulated with isopropyl alcohol, separated, and then dried. Data are presented in the following table:

TABLE V

| Run No. | DIMB, mhm. | I₂, mhm. | TBA:DIMB or I₂:TTC Mole Ratio | Conv., Percent | Inh. Vis. |
|---|---|---|---|---|---|
| 1 | 0.8 | | 5.5:2:1 | 76 | 2.74 |
| 2 | 0.4 | | 5.5:1:1 | 72 | 2.12 |
| 3 | | 0.8 | 5.5:2:1 | 80 | 2.36 |
| 4 | | 0.4 | 5.5:1:1 | 11 | 1.49 |

The data show that good results can be obtained at lower iodine levels when operating according to the process of the invention than when using elemental iodine as a catalyst component. Conversion was low in run 4 whereas good results were obtained in run 2. The iodine level was the same in both runs. The polymers obtained in these systems have a high cis content.

As will be evident to those skilled in the art, many variations and modifications of the invention can be practiced in view of the foregoing disclosure. Such variations and modifications are believed to come within the spirit and scope of the invention.

I claim:

1. A process for polymerizing 1,3-butadiene to produce a polymer containing a high percentage of cis-1,4-addition which comprises contacting 1,3-butadiene under polymerization conditions with a catalyst which forms on mixing components consisting essentially of (a) an organometal compound selected from the group consisting of compounds having the formula $R_3Al$ and compounds having the formula $R_2AlH$, wherein R is selected from the group consisting of alkyl, cycloalkyl, aryl, and combinations of these radicals, (b) a titanium halide having the formula $TiX_y$, wherein X is selected from the group consisting of chlorine and bromine, and y is an interger from 2 to 4, inclusive, and (c) at least one preformed reaction product formed by reacting iodine with butadiene or iodine with isoprene, wherein said reaction product is formed by reacting iodine with 1,3-butadiene or iodine with isoprene at a temperature in the range of —100 to 250° F. for a period of time of from 0.1 second to 1 hour and wherein the mol ratio of 1,3-butadiene to iodine or isoprene to iodine is at least 1:1.

2. The process of claim 1 wherein a portion of the 1,3-butadiene to be polymerized is reacted with iodine in a catalyst prepartion zone to produce a reaction product and said reaction product is thereafter combined with the remainder of the 1,3-butadiene to be polymerized in a polymerization zone.

3. A process for polymerizing 1,3-butadiene to produce a polymer containing a high percentage of cis-1,4-addition which comprises contacting 1,3-butadiene under polymerization conditions with a catalyst which forms on mixing components consisting essentially of (a) an organometal compound selected from the group consisting of compounds having the formula $R_3Al$ and compounds having the formula $R_2AlH$, wherein R is selected from the group consisting of alkyl, cycloalkyl, aryl, and combinations of these radicals, (b) a titanium halide having the formula $TiX_y$, wherein X is selected from the group consisting of chlorine and bromine, and y is an integer from 2 to 4, inclusive, and (c) the preformed reaction product formed by reacting iodine with 1,3-butadiene or iodine with isoprene; wherein the mol ratio of said organometal compound to said titanium halide is in the range of 2:1 to 20:1 and the mol ratio of said titanium halide to each mol of iodine in said reaction product is in the range of 0.2:1 to 10:1; and said reaction product is formed by reacting iodine with 1,3-butadiene or iodine with isoprene at a temperature in the range of —100 to 250° F. for a period of time of from 0.1 second to 1 hour and wherein the mol ratio of 1,3-butadiene to iodine or isoprene to iodine is at least 1:1.

4. The process according to claim 3 in which said catalyst is one which forms on mixing components consisting essentially of triisobutylaluminum, titanium tetrachloride and the preformed product formed by reacting iodine with butadiene, said preformed product being formed by reacting iodine with 1,3-butadiene at a temperature in the range of —100 to 250° F. for a period of time of from 0.1 second to 1 hour and wherein the mol ratio of 1,3-butadiene to iodine is at least 1:1.

5. The process according to claim 3 in which said catalyst is one which forms on mixing materials consisting essentially of triethylaluminum, titanium tetrachloride and the preformed product formed by reacting iodine with butadiene, said preformed product being formed by reacting iodine with 1,3-butadiene at a temperature in the range of —100 to 250° F. for a period of time of from 0.1 second to 1 hour and wherein the mol ratio of 1,3-butadiene to iodine is at least 1:1.

6. A process for polymerizing 1,3-butadiene which comprises contacting 1,3-butadiene under polymerization conditions with a catalyst which forms on mixing components consisting essentially of (a) an organometal compound selected from the group consisting of compounds having the formula $R_3Al$ and compounds having the formula $R_2AlH$, wherein R is selected from the group consisting of alkyl, cycloalkyl, aryl, and combinations of these radicals, (b) a titanium halide having the formula $TiX_y$, wherein X is selected from the group consisting of chlorine and bromine, and y is an integer from 2 to 4, inclusive, and (c) the preformed reaction product formed by reacting iodine with butadiene, said contacting occurring in the presence of a hydrocarbon diluent at a temperature in the range of −100 to 250° F. and under autogenous pressure; and recovering a polymer of butadiene containing a high percentage of cis 1,4-addition; said reaction product being formed by reacting iodine with 1,3-butadiene at a temperature in the range of −100 to 250° F. for a period of time of from 0.1 second to 1 hour and wherein the mol ratio of 1,3-butadiene to iodine is at least 1:1.

7. The process according to claim 6 in which the mol ratio of said organometal compound to said titanium halide is in the range of 2:1 to 20:1 and the mol ratio of said titanium halide to said each mold of iodine in said reaction product is in the range of 0.20:1 to 10:1.

8. A process for polymerizing 1,3-butadiene which comprises introducing into a first mixing zone 1,3-butadiene to be polymerized, a hydrocarbon diluent and an organometal compound selected from the group consisting of compounds having the formula $R_3Al$ and compounds having the formula $R_2AlH$, wherein R is selected from the group consisting of alkyl, cycloalkyl, aryl, and combinations of these radicals; charging to a second mixing zone 1,3-butadiene and iodine wherein they are reacted at a temperature in the range of −100 to 250° F. for a period of time of from 0.1 second to 1 hour, thereby preforming a reaction product, the mol ratio of 1,3-butadiene to iodine in said second mixture zone being at least 1 to 1; mixing effluent containing said reaction product recovered from said second mixing zone with effluent recovered from said first mixing zone; introducing into a polymerization zone as a feed stream the resulting mixture of effluents from said first and second mixing zones; prior to introduction of said feed stream into said polymerization zone adding thereto a titanium halide having the formula $TiX_y$, wherein X is selected from the group consisting of chlorine and bromine, and y is an integer from 2 to 4, inclusive; maintaining said polymerization zone at a temperature in the range of −100 to 250° F. and at a pressure sufficient to maintain said hydrocarbon diluent substantially in liquid phase; and recovering from said polymerization zone a polybutadiene containing a high percentage of cis 1,4-addition.

9. A process for polymerizing 1,3-butadiene to produce a polymer containing a high percentage of cis-1,4 addition which comprises contacting 1,3-butadiene under polymerization conditions at about 41° F. with a catalyst which forms on mixing components consisting essentially of (a) an organometal compound selected from the group consisting of triethylaluminum and triisobutylaluminum, (b) titanium tetrachloride, and (c) the preformed reaction product formed by reacting iodine with 1,3-butadiene or iodine with isoprene; wherein the mol ratio of said organometal compound to said titanium tetrachloride is in the range of 2:1 to 20:1 and the mol ratio of said titanium tetrachloride to each mol of iodine in said reaction product is in the range of 0.2:1 to 10:1; and said reaction product is formed by reacting iodine with 1,3-butadiene or iodine with isoprene at a temperature in the range of −100 to 250° F. for a period of time of from 0.1 second to 1 hour and wherein the mol ratio of 1,3-butadiene to iodine or isoprene to iodine is at least 1:1.

10. A catalyst composition which forms on mixing components consisting essentially of (a) an organometal compound selected from the group consisting of compounds having the formula $R_3Al$ and compounds having the formula $R_2AlH$, wherein R is selected from the group consisting of alkyl, cycloalkyl, aryl, and combinations of these radicals, (b) a titanium halide having the formula $TiX_y$, wherein X is selected from the group consisting of chlorine and bromine, and y is an integer from 2 to 4, inclusive, and (c) the preformed reaction product formed by reacting iodine with butadiene or iodine with isoprene, said preformed reaction product formed by reacting iodine with 1,3-butadiene or iodine with isoprene at a temperature in the range of −100 to 250° F. for a period of time of from 0.1 second to 1 hour and wherein the mol ratio of 1,3-butadiene to iodine or isoprene to iodine is at least 1:1.

11. A catalyst composition which forms on mixing components consisting essentially of (a) an organometal compound selected from the group consisting of compounds having the formula $R_3Al$ and compounds having the formula $R_2AlH$, wherein R is selected from the group consisting of alkyl, cycloalkyl, aryl, and combinations of these radicals, (b) a titanium halide having the formula $TiX_y$, wherein X is selected from the group consisting of chlorine and bromine, and y is an integer from 2 to 4, inclusive, and (c) the preformed reaction product formed by reacting iodine with 1,3-butadiene or iodine with isoprene; wherein the mol ratio of said organometal compound to said titanium halide is in the range of 2:1 to 20:1 and the mol ratio of said titanium halide to each mol of iodine in said reaction product is in the range of 0.2:1 to 10:1; and said reaction product is formed by reacting iodine with 1,3-butadiene or iodine with isoprene at a temperature in the range of −100 to 250° F. for a period of time of from 0.1 second to 1 hour and wherein the mol ratio of 1,3-butadiene to iodine or isoprene to iodine is at least 1:1.

12. A catalyst composition which forms on mixing components consisting essentially of (a) an organometal compound selected from the group consisting of triethylaluminum and triisobutylaluminum, (b) titanium tetrachloride, and (c) the preformed reaction product formed by reacting iodine with 1,3-butadiene or iodine with isoprene; wherein the mol ratio of said organometal compound to said titanium tetrachloride is in the range of 2:1 to 20:1 and the mol ratio of said titanium tetrachloride to each mol of iodine in said reaction product is in the range of 0.2:1 to 10:1; and said reaction product is formed by reacting iodine with 1,3-butadiene or iodine with isoprene at a temperature in the range of −100 to 250° F. for a period of time of from 0.1 second to 1 hour and wherein the mol ratio of 1,3-butadiene to iodine or isoprene to iodine is at least 1:1.

13. A catalyst composition which forms on mixing components consisting essentially of triisobutylaluminum, titanium tetrachloride and the preformed reaction product formed by reacting iodine with butadiene said preformed product being formed by reacting iodine with 1,3-butadiene at a temperature in the range of −100 to 250° F. for a period of time of from 0.1 second to 1 hour and wherein the mol ratio of 1,3-butadiene to iodine is at least 1:1.

14. A catalyst composition which forms on mixing components consisting essentially of triethylaluminum, titanium tetrachloride and the preformed reaction product formed by reacting iodine with butadiene said preformed product being formed by reacting iodine with 1,3-butadiene at a temperature in the range of −100 to 250° F. for a period of time of from 0.1 second to 1 hour and wherein the mol ratio of 1,3-butadiene to iodine is at least 1:1.

15. A catalyst composition which forms on mixing components consisting essentially of tri-isobutyl-aluminium, titanium tetrachloride and the preformed reaction product formed by reacting isoprene and iodine said preformed reaction product being formed by reacting iodine with isoprene at a temperature in the range of −100 to 250° F. for a period of time of from about 0.1 second to 1 hour and wherein the mol ratio of isoprene to iodine is at least 1:1.

16. A catalyst composition which forms on mixing components consisting essentially of diisobutylaluminum hydride, titanium tetrachloride and the preformed reaction product formed by reacting iodine with butadiene said preformed product being formed by reacting iodine with 1,3-butadiene at a temperature in the range of −100 to 250° F. for a period of time of from 0.1 second to 1 hour and wherein the mol ratio of 1,3-butadiene to iodine is at least 1:1.

References Cited

UNITED STATES PATENTS

| | | | |
|---|---|---|---|
| 3,205,213 | 9/1965 | Stearns et al. | 260—94.3 |
| 2,483,049 | 9/1949 | Hillyer et al. | 260—654 |
| 3,206,447 | 9/1965 | Zelinski | 260—94.3 |

OTHER REFERENCES

Grippin, ACS Preprints, v. 6, No. 4, September 1961 pp. A–25 to A–42, p. A–25 relied on, TP690 A1 A5a.

JAMES A. SEIDLECK, *Primary Examiner.*

J. L. SCHOFER, *Examiner.*

E. J. SMITH, *Assistant Examiner.*

UNITED STATES PATENT OFFICE
CERTIFICATE OF CORRECTION

Patent No. 3,379,705                 April 23, 1968

Alvin C. Rothlisberger

It is certified that error appears in the above identified patent and that said Letters Patent are hereby corrected as shown below:

Column 12, line 24, "cis-1,4-addition" should read -- cis-1,4 addition --. Column 13, line 15, "said each mold" should read -- each mol --; line 29, "mixture" should read -- mixing --.

Signed and sealed this 28th day of October 1969.

(SEAL)
Attest:

Edward M. Fletcher, Jr.            WILLIAM E. SCHUYLER, JR.

Attesting Officer                Commissioner of Patents